May 28, 1935.  E. MENDENHALL ET AL  2,002,918

FLUID PACKED SEAL

Filed June 29, 1931

INVENTORS:
EARL MENDENHALL,
JUNIUS B. VAN HORN,
CLARENCE J. COBERLY,
BY

ATTORNEY.

Patented May 28, 1935

2,002,918

UNITED STATES PATENT OFFICE 2,002,918

FLUID-PACKED SEAL

Earl Mendenhall, Junius B. Van Horn, and Clarence J. Coberly, Los Angeles, Calif.; said Mendenhall and said Van Horn, assignors to Menhorn, Inc., Los Angeles, Calif., a corporation of California Application June 29, 1931, Serial No. 547,542

27 Claims. (Cl. 286—9)

Our invention relates to a sealing device for a rotary shaft, and more particularly to a fluid-packed seal for preventing admixture of two fluids communicating with the junction of a rotating shaft and a shell.

One application of our invention is in effectively sealing the junction of a rotating shaft and a shell containing an internal liquid, the shell being surrounded by an external liquid, and it is an important object of the present invention to provide a seal which will effectively prevent any mixture of such liquids, the seal disclosed in the present invention being effective at much higher speeds than any fluid-packed seal heretofore known.

In its simplest form, the seal includes an annular body of mercury or other sealing liquid, together with an apron extending to a point below the surface of this sealing liquid, the apron being secured to either the shell or the shaft, the annular body of mercury being retained by the other of these members, and it is an object of this invention to set up a circulation in the sealing liquid itself which tends to prevent any breaking of the seal.

As mentioned in a co-pending application filed by Earl Mendenhall and Junius B. Van Horn, entitled Improved sealing device, Serial 544,792, it has been found preferable to rotate the body of mercury or other sealing fluid, and to maintain the apron which dips thereinto stationary, keeping the pressures on the external and internal liquids substantially equal to prevent disruptive displacement of the mercury or other sealing liquid. The centrifugal force on the mercury is extremely high, and any tendency for one of the liquids to mix therewith tends to be prevented by this centrifugal action. However, as disclosed in the application supra, extensive tests have shown that even with such a combination there is a tendency for small amounts of the internal liquid, and sometimes the external liquid, contacting the mercury to enter the mercury and flow therethrough in certain quite definite circulation paths. This is especially true in the space between the apron and the shaft, and it is an important object of the present invention to set up a circulation in the mercury or other sealing liquid so as to flow a stream of this sealing liquid adjacent the lower end of the baffle, and preferably in such a direction that the flow of mercury enters this space between the apron and the shaft immediately below the apron.

Another object of the invention is to provide a seal having an apron of improved design, the shape of this apron permitting the use of the seal at high shaft speeds.

Still another object of the invention is to provide a seal wherein telescoping members are utilized, these members usually taking the form of an apron with a baffle extending upward therein.

Further objects of the invention lie in the novel constructional details of the seal.

Referring to the drawing,—

Figure 1:
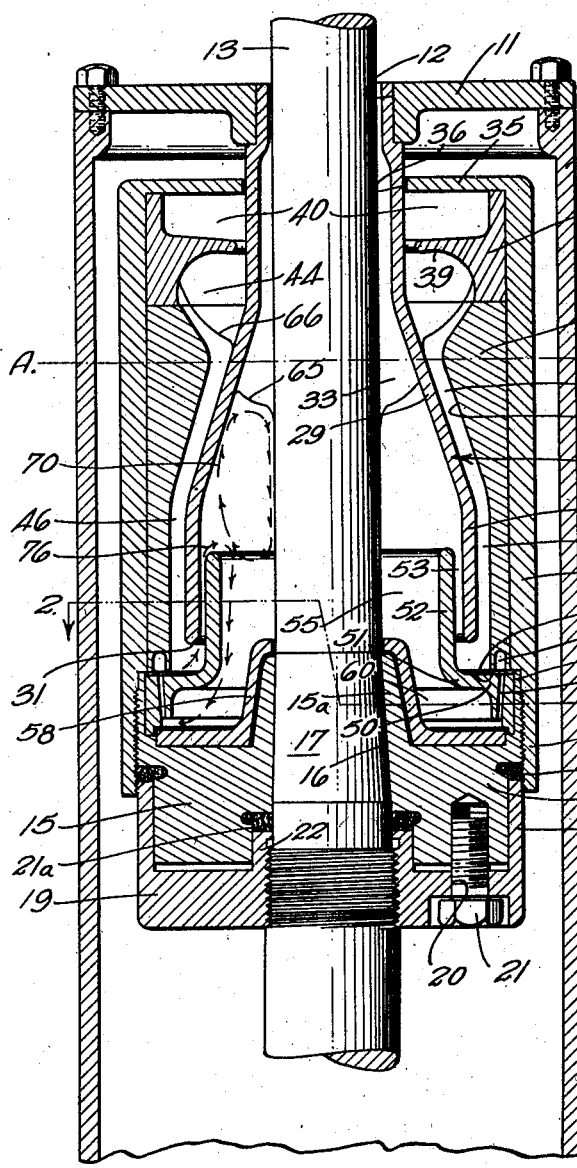
Fig. 1 is a sectional view of the preferred form of our invention.
Figure 2:
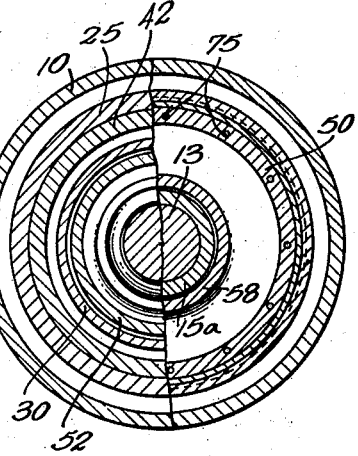
Fig. 2 is a sectional view taken on the line 2—2 of Fig. 1.

Referring particularly to Fig. 1, we have shown a shell 10 including a cover member 11 providing an opening 12 therein and through which a shaft 13 extends, this shaft being rotatable and extending into the interior of the shell 10, it being understood that only the upper end of this shell is shown in Fig. 1.

For the purpose of illustration, our seal will be described in combination with a shell which is substantially filled with an internal liquid, this shell being submerged in an external liquid, the function of the seal being to effectively separate and prevent intermixture of these liquids. It should be understood, however, that we are not limited to this use for the seal is equally effective in separating two gaseous mediums, or a gaseous medium and a liquid. The separation of two liquids represents by far the most difficult problem, especially where it is essential that no trace of the external liquid should become mixed with the internal liquid. Thus, for instance, if the shell 10 were filled with a dielectric material and an electric motor were positioned therein for rotating the shaft 13, it would be essential to keep all foreign liquid from the interior of this shell to prevent burn-out of the motor. It is to a combination such as this that the present invention is particularly adapted.

As shown in Fig. 1, the seal of our invention includes a base member 15 adapted to be slid downward over the shaft 13 and providing a dome 15a including a tapered bore 16 which clamps against the surface of a tapered portion 17 of the shaft 13 when in the position shown in Fig. 1. A clamping member 19 is threaded to the shaft at a position below the tapered portion 17 and contains openings 20 through which studs 21 pass, these studs being threaded into the base member 15. By tightening the studs 21 the base member is thus drawn downward with respect to the shaft, thus firmly clamping the base member against the tapered portion 17 and preventing any relative rotation therebetween.

In addition, the base member provides an inner cavity 21a containing a suitable packing, while the clamping member 19 provides an inner gland portion 22 extending into this cavity in compressing relationship with this packing whereby a fluid-tight seal is formed between the base member and the shaft when the studs 21 are tightened.

The upper portion of the base member 15 comprises a flange 23 which is externally threaded to engage a downward extending lip 24 of a shell 25, the lip and base member providing a chamber 26 in which an outer packing is positioned, this packing being engaged by an outer gland member 27 of the clamping member 19. When the studs 21 are tightened, this gland member 27 moves into compressing relationship with the packing in the chamber 26 so as to form a fluid-tight seal between the shell 25 and the base member 15.

Suitably secured in the opening 12 of the cover member 11, and extending downward around the shaft 13, is an apron 28 including a downward diverging or sloping portion 29 and a lower sleeve portion 30 which is cylindrical in shape and which extends parallel to the shaft 13. The lower end of the sleeve portion 30 is indicated by the numeral 31, while the space between the apron 28 and the periphery of the shaft is designated by the numeral 33.

The upper end of the shell 25 provides a cap 35 which may be formed integrally therewith, but which is spaced from the periphery of the apron 28 by an annular space 36. Forming a snug fit in the shell 25 and positioned immediately below the cap 35 is an upper insert member 38 which provides a downward sloping ledge 39 extending toward but terminating a distance from the periphery of the apron 28 as best shown in Fig. 1, that space between the ledge 39 and the cap 35 being designated as a storage chamber 40.

Immediately below the upper insert member 38 and abutting thereagainst is a lower insert member 42, these insert members cooperating in defining an intermediate chamber 44. The lower insert member 42 is preferably shaped as shown in Fig. 1 so as to provide an inner tapered surface 43 which corresponds to the diverging portion 29, but which is spaced therefrom by an annular space 45. Similarly, the lower portion of the insert member 42 is spaced from the lower sleeve portion 30 of the apron to define an annular space 46, the lower end of the insert member 42 terminating at approximately the same elevation as the upper end of the flange 23 of the base member 15.

Forming a tight fit inside the flange 23 is a baffle member 50 which may conveniently engage both the base member 15 and the bottom of the insert member 42. This baffle member has a flange 51 which extends inward to a point inside the lower sleeve portion 30 of the apron 28, and supports a baffle 52 which extends upward in telescoping relationship with the lower end of the apron 28, but separated therefrom so as to provide an annular circulating space 53, the annular space between the baffle 52 and the periphery of the shaft 13 being indicated by the numeral 55.

The dome 15a of the base member 15 forms an annular ring about the shaft, the upper surface thereof extending outward from the shaft. This dome, as well as the upper surface of the base member 15, is preferably covered by a protector 58 which extends downward around the dome of the base member 15 and outward into engagement with the lower end of the baffle member 50 so as to cooperate with this member in defining an auxiliary or pumping chamber 60.

The preferred form of the seal of our invention thus includes a cup means rotating with the shaft and into which the apron 28 extends. Mercury or other sealing fluid is poured into this cup means until it extends to a level approximately as indicated by the line A—A of Fig. 1 so that when the seal is in operation, the mercury in the annular space 33 will assume a position approximately as indicated by the numeral 65, this surface being hereinafter termed a primary surface, while the mercury in the annular space 46 around the apron will assume a position approximately as indicated by the numeral 66, the surface of the mercury in this space being hereinafter termed a secondary surface. If the shell 10 is submerged in an external liquid, it is at once apparent that this external liquid will be in contact with the primary surface 65, while the internal liquid inside the shell will fill the storage chamber 40 and will be in surface contact with the secondary mercury surface 66, so as to fill that portion of the cup means above this surface.

As pointed out in the application of Earl Mendenhall and Junius B. Van Horn, supra, there is a tendency for the external liquid which contacts the primary mercury surface 65 to move downward immediately around the shaft 13, this being due mainly to the capillary space which is formed immediately around the shaft due to the fact that the mercury does not tend to wet the surface of this shaft and tends to be thrown away therefrom by the centrifugal force thereon. It is of utmost importance that none of this external liquid should flow beneath the lower end 31 of the apron 28 for otherwise it would rise through the mercury in the spaces 45 and 46 and thus contaminate the internal liquid in the shell. In the present invention the baffle 52 prevents any possibility of this external liquid moving under the lower end of the apron 28, the circulation path of this external liquid through the mercury being indicated by the arrows 70 of Fig. 1. It is thus apparent that any minute circulation of external liquid which might take place in the mercury in the annular space 33 will move upward inside the baffle rather than being allowed to move under the lower end thereof. The baffle 52 thus cooperates in preventing any passage of external liquid under the lower end of the apron 28. So also, the outward extending upper surface of the dome 15a is positioned in the path of this downwardly moving minute circulation, thus moving this external liquid outward from its position adjacent the shaft.

In addition, we have found it desirable to set up a circulation in the mercury itself, this circulation preferably being upward through the annular space 53 between the baffle 52 and the apron 28, and downward through the annular space 55 and into the auxiliary chamber 60. Experiments have shown that the mercury rotates faster in the chamber 60 than it does in any other part of the seal, due probably to the fact that all of the walls of the chamber 60 are rotating and that this chamber is not relatively large. The skin friction between the mercury and the walls of this chamber is sufficient to rotate the mercury therein around the axis of the shaft at a speed which is only very slightly below the speed of the shaft. On the other hand, the annular chamber 33, for instance, being bounded on one side by a stationary member (the apron 28) and on the other side by a rotating member (the periphery of the shaft), is not effective in rotating the mercury at as high a speed. The result is that the pressure in the auxiliary chamber 60 is much higher than the pressure in the annular space 33. We have thus found it possible by drilling a plurality of holes or openings 75 through the baffle member 50, as shown in Fig. 1, the lower ends of these holes communicating with the auxiliary chamber 60 and the upper ends of these holes communicating with the annular circulating space 53, to set up a very desirable circulation of the mercury itself, this circulation taking place as indicated by the arrows 76 of Fig. 1. We have also found it possible to increase the amount of this circulation by drilling the holes 75 so that they extend non-parallel to the axis of the shaft, and preferably so that the upper ends thereof are at a greater radial distance from the axis of the shaft than the lower ends thereof. These openings 75 thus in addition act as a minute centrifugal pump tending to increase the flow through the path indicated by the arrows 76.

To insure an equal distribution of this mercury stream, we prefer to form the lower end of the baffle member 42 as shown in Fig. 1, cutting an annular channel 78 therein and into which the mercury flowing through the openings 75 discharges. The mercury flows from the channel 78 through a throttling or distributing space 79 formed between the lower end of the insert member 42 and the upper surface of the baffle member 50. The mercury flows from the throttling or distributing space 79 in a smooth stream, and moves inward and upward through the circulating space 53 and downward through the annular space 55 and again into the chamber 60. This circulation eliminates all possibility of any of the external liquid which is circulating in the annular space 33 from moving downward in the circulating space 53, and thus under the lower end 31 of the apron 28.

We have found, however, that in some cases adequate protection is afforded by either the baffle 52 extending upward inside the apron 28 or by the mercury-circulation stream disclosed in Fig. 1. As an added precaution, however, we prefer to install both protective systems in commercial seals so that all danger of intermixture between the internal and external liquids is eliminated. It has also been found that a seal containing these combined features will operate successfully at higher speeds than will a seal with either of these features alone.

It is entirely possible, however, to utilize the inward circulation of mercury immediately below the baffle 28 to insure an efficient sealing action. Thus, in Fig. 3 we have illustrated a part of an alternative seal in which no baffle 52 is utilized, but in which the mercury flows inward immediately below the lower end of the apron 28, this inward flow of mercury effectively preventing any external liquid from moving outward beneath this apron and thus having an opportunity of intermixing with the internal liquid filling the shell. The circulation path in the mercury in this instance is indicated by the arrows 100, while the most detrimental circulation of external liquid in the mercury is indicated by the arrows 101. It should be understood that under usual conditions this internal circulation of external liquid does not take place to the extent illustrated in Fig. 3, but that the conditions illustrated therein are under extremely adverse conditions at high shaft speeds. It will further be found that any external liquid moving through the path indicated by the arrows 101 will not move downward and outward in the auxiliary chamber so as to be forced upward through the openings 75. This is because of the high centrifugal force on the mercury in the auxiliary chamber, and the self-cleaning action of such a rotating body whereby any particles of less density will move toward the shaft and into an area of lower pressure, rather than outward into an area where the centrifugal force on the mercury maintains an even higher pressure.

Figure 3:
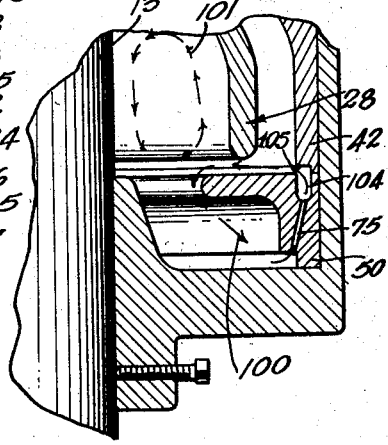
Fig. 3 is a detail of an alternative form of the invention.

So also, in Fig. 3 we have illustrated a slightly different form of pumping system wherein the openings 75 discharge into an annular channel 104 formed in the baffle member 50 itself rather than being formed in the insert member 42, the lower end of the insert member 42 cooperating with the upper surface of the baffle member 50 in defining a distributing space 105 similar to the space 79 previously described.

As mentioned in the co-pending application supra, it has been found very desirable, when using mercury as a sealing fluid, to form the apron 28 and the insert members 38 and 42 of a non-corrosive material which is not detrimentally affected by the presence of mercury. In addition, in the present invention we prefer to form the baffle member 50 of such a material, as well as the protector 58. These members may, for instance, be formed of glass, "bakelite", or other non-corrosive materials, or may be formed of a suitably treated metal or may provide surfaces which are coated with vitreous enamel, porcelain, etc.

While mercury has been found to constitute a very desirable sealing medium, we are not in all instances limited to this use, other high-density liquids being also valuable in this regard.

We claim as our invention:

1. A seal for sealing the junction of a vertically positioned rotatable member and a stationary member, including in combination: cup means secured to one of said members and retaining a body of sealing liquid; an apron secured to the other of said members and extending downward around said rotatable member and into said sealing liquid, said apron terminating in a lower edge submerged in said sealing liquid at all times regardless of the operation of said seal; and a pumping means setting up a continuous circulating flow of said sealing liquid in said cup means and transversely across said lower edge.

2. A seal for preventing admixture of two fluids communicating with a junction of a stationary member and a rotatable member, which seal includes in combination: a primary member secured to said stationary member; a secondary member secured to said rotating member and extending adjacent said primary member to define a circulation space providing a pair of ends; a body of sealing liquid separating said fluids and filling said circulation space and the spaces at opposite ends thereof at all times regardless of the rotation of said rotatable member; and pump means intaking from one end of said circulation space and discharging into the other for circulating a stream of said sealing liquid in a path through said circulation space from one end to the other end and returning to the first end through a zone exterior of said circulation space.

3. A seal for sealing the junction of a rotatable shaft and a stationary member: cup means secured to said shaft and retaining a body of a sealing liquid; an apron secured to said stationary member and extending into said cup means and into said body of sealing liquid; and a baffle around said shaft affixed in said cup means and submerged in said sealing liquid and extending in said cup means in telescoping relationship with said apron.

4. In combination in a seal for sealing the junction of a rotatable shaft and a stationary member: an apron around and spaced from said rotatable shaft and secured to said stationary member; baffle also around and spaced from said rotatable shaft and rotating therewith, said baffle extending into the space between said apron and said rotatable shaft in telescoping relation with said apron whereby said apron and said baffle define an annular circulation space therebetween; and means for continuously circulating a stream of a sealing liquid through said annular space from end to end during the time said rotatable shaft is rotating.

5. A seal for sealing the junction of a primary and a secondary member between which relative movement can take place: cup means secured to said secondary member and providing an annular space around said secondary member and containing a body of sealing liquid; an apron secured to said primary member and extending downward into said body of sealing liquid; and a baffle positioned in said cup means and in said body of sealing liquid and secured in fixed relation with said cup means to extend in telescoping relation with the lower end of said apron but spaced therefrom whereby the sealing liquid on one side of said baffle and which lies in the space between said apron and said baffle is bounded by surfaces moving relative to each other and the sealing liquid on the other side of said baffle is bounded by surfaces which do not move relative to each other.

6. A seal for sealing the junction of a primary and a secondary member between which relative movement can take place: cup means secured to said secondary member and providing an annular space around said secondary member and containing a body of sealing liquid; an apron secured to said primary member and extending downward into said body of sealing liquid; a baffle secured in fixed relation with said cup means and positioned in said body of sealing liquid and extending in spaced relationship with the lower portion of said apron to define a circulation space therebetween; and means for circulating a stream of said sealing liquid in a closed path around said baffle so that the stream of sealing liquid flows on opposite sides of said baffle, one portion of this path including said circulation space whereby said stream of sealing liquid flows through said circulation space from end to end.

7. A seal for sealing the junction of a rotatable shaft and a stationary member: an apron secured to said stationary member and providing a sloping portion and a cylindrical portion therebelow; a cylindrical baffle rotating with said shaft and extending upwards in telescoping relation with said cylindrical portion to define an annular space; and means for retaining a body of sealing liquid filling said annular space during the rotation of said rotatable shaft.

8. A seal for sealing the junction of a rotatable shaft and a stationary member, which includes: cup means rotating with said shaft and containing a body of sealing liquid which rotates therewith; and an apron attached to said stationary member and providing a sloping portion and a cylindrical portion therebelow, said cylindrical portion extending downward to a point below the surface of said sealing liquid, said cylindrical portion terminating in a lower, downwardly directed edge lying above the bottom wall of said cup means.

9. In combination in a seal for sealing the junction of a rotatable member and a stationary member: a cup means secured to one of said members and containing a body of sealing liquid; an apron secured to the other of said members, the lower portion of said apron being spaced from said rotatable member and extending into said sealing liquid to divide the surface thereof into primary and secondary surfaces; and means for setting up a circulation of sealing liquid in said cup means, the sealing liquid flowing through a closed circulation path spaced from both said primary and secondary surfaces, a portion of said closed circulation path being adjacent the lower end of said apron.

10. In combination in a seal for sealing the junction of a rotatable shaft and a stationary member: a cup means secured to said shaft and containing a body of sealing liquid, said cup means providing a main chamber containing a portion of said sealing liquid and providing an auxiliary chamber containing another portion of said sealing liquid and rotating this portion of said sealing liquid at high velocity to build up a pressure therein which is greater than the pressure of said sealing liquid in said main chamber; an apron around said rotatable shaft and extending to a point below the surface of said sealing liquid and secured to said stationary member; and walls forming a passage means associated with said cup means and communicating at one end with said auxiliary chamber, the other end of said passage means opening on the sealing liquid in said main chamber whereby a flow of sealing liquid takes place through said passage means from said auxiliary chamber to said main chamber.

11. In a seal for sealing the junction of a stationary member and a rotatable shaft, the combination of: a cup means rotating with said shaft and carrying a body of sealing liquid; an apron attached to said stationary member and providing an end portion extending to a point below the surface of said sealing liquid; a pumping means including walls associated with said cup means and submerged in said sealing liquid and forming one or more openings extending from points spaced a given distance from the axis of said shaft to points a greater distance from the axis of said shaft whereby the rotation of said cup means sets up a pumping action, said pumping action setting up a circulation flow of said sealing liquid through said openings and across the end portion of said apron.

12. In a seal, the combination of: Walls defining an annular chamber containing an annular body of sealing liquid; an apron extending into said body of sealing liquid and dividing the surface thereof into primary and secondary surfaces; pumping means for circulating a stream of said sealing liquid adjacent said apron and through a closed circulation path spaced from both said primary and secondary surfaces; and spaced walls defining a distributing space communicating with the discharge of said pumping means for guiding said stream of said sealing liquid as it flows adjacent said apron.

13. In a seal, the combination of: walls defining an annular chamber containing an annular body of sealing liquid; an apron extending into said body of sealing liquid; pumping means for circulating a stream of said sealing liquid adjacent said apron, said pumping means including one or more openings through which the sealing liquid flows; walls defining an annular chamber adjacent the ends of said openings and into which flows the sealing liquid discharged from said openings; and distributing means communicating with said annular chamber and guiding the sealing liquid moving therefrom, said distributing means including a discharge passage directed toward said apron.

14. In a seal for sealing the junction of a stationary member and a rotatable shaft, the combination of: a cup means rotating with said shaft and carrying a body of sealing liquid; an apron attached to said stationary member and extending to a point below the surface of said sealing liquid; a ledge extending inward from said cup means and beneath the lower end of said apron, said ledge being spaced from said lower end of said apron to define a space; and means for circulating a stream of said sealing liquid in a closed path around said ledge, said stream moving through said space and returning beneath said ledge.

15. In a seal for sealing the junction of a stationary member and a rotatable member, the combination of: a base member secured to said rotatable member and providing an upward extending dome; a protector covering said dome; a shell secured to said base member and cooperating therewith in defining a cup means containing a body of sealing liquid; and a stationary apron extending downward in said cup means and into said body of sealing liquid, opposite sides of said apron communicating with the fluids to be separated at said junction.

16. In a seal for sealing the junction of a stationary member and a rotatable member, said rotatable member providing a tapered portion, the combination of: a base member providing a bore tapered to correspond to the taper of said portion of said rotatable member; clamping means for moving said base member relative to said rotatable member to seat said tapered portion in said bore; a shell extending upward from said base member and cooperating therewith in defining a cup means containing a body of sealing liquid; and a stationary apron associated with said stationary member and extending downward in said cup means and into said body of sealing liquid.

17. In a seal for sealing the junction of a stationary member and a rotatable member, said rotatable member providing a tapered portion, the combination of: a clamping member secured to said rotatable member; a base member providing a bore tapered to correspond to said tapered portion of said rotatable member; means for moving said base member relative to said clamping member to seat said tapered portion in said bore; a shell extending upward from said base member and cooperating therewith in defining a cup means containing a body of sealing liquid; and a stationary apron associated with said stationary member and extending downward in said cup means and into said body of sealing liquid.

18. A combination as defined in claim 17 including a packing means between said clamping member and said base member and compressed by said means for moving said base member relative to said clamping member.

19. A combination as defined in claim 17 including a packing means sealing said base member and said shell, and in which said clamping member provides a gland member engaging said packing.

20. A combination as defined in claim 14 including a baffle extending upward from said ledge and in spaced relationship with said apron to define a circulating space through which said circulating stream of said sealing liquid flows in moving through said closed path.

21. In a seal for sealing the junction of a rotatable member and a stationary member, the combination of: cup means secured to one of said members; an apron secured to the other of said members; a baffle secured to said cup means and extending upward inside said apron in telescoping relation with said apron and terminating in an upper portion in said cup means; and a body of sealing liquid in said cup means entirely filling the lower end thereof and submerging said upper portion of said baffle at all times irrespective of the rotation of said rotatable member.

22. A seal for sealing the junction of two elements, one of which includes a rotatable shaft: cup means secured to one of said elements and providing an annular chamber around said shaft, said annular chamber containing a body of sealing liquid; an apron secured to the other of said elements and terminating in an edge lying beneath the surface of said sealing liquid when said shaft is rotated, the space between said shaft and said apron containing a portion of said sealing liquid; and pumping means for setting up a circulation of said sealing liquid transversely across said edge of said apron in a direction toward said shaft to confine to the space between said apron and said shaft any contamination of said sealing liquid.

23. A seal for sealing the junction of a rotating member and a stationary member, which seal includes in combination: cup means rotating with said rotating member and containing a body of sealing liquid; an apron secured to said stationary member and extending to a point below the surface of said sealing liquid; means for setting up a closed circulation of said sealing liquid, the liquid moving through this closed circulation path passing adjacent the end of said apron; and centrifugal means in said closed circulation path and through which said sealing liquid flowing in said closed circulation passes, said centrifugal means removing from said sealing liquid any contaminating liquid of a density different from the density of said sealing liquid and which becomes associated therewith.

24. A combination as defined in claim 2 in which said zone exterior of said circulation space contains a centrifugal means through which the return flow of said sealing liquid passes, said centrifugal means removing from this return flow of sealing liquid any of said fluids which may have moved thereinto, whereby the sealing liquid pumped through said circulation path is substantially pure.

25. A combination as defined in claim 2 including walls rotating with said rotatable member and defining an auxiliary chamber containing sealing liquid and rotating this sealing liquid at a high velocity, thus separating therefrom any of said fluids which become associated with said sealing liquid, said chamber being included in said zone exterior of said circulation space whereby the return flow of said sealing liquid is purified before being again pumped through said circulation space.

26. In a seal for sealing the junction of a stationary member and a rotatable shaft, the combination of: cup means secured to said shaft and rotating therewith to define an annular chamber therearound containing a body of sealing liquid, said annular chamber providing a bottom wall; a stationary apron secured to said stationary member and extending into said sealing liquid and terminating beneath the surface thereof, the space between said apron and said shaft containing a liquid contacting the surface of said sealing liquid and tending to move downward around said shaft surface to a position below the surface of said sealing liquid; and an annular ring surrounding said shaft in said annular chamber and providing an outward extending surface positioned beneath the surface of said sealing liquid and above said bottom wall and thus being in the path of any of said liquid moving downward around said shaft.

27. A combination as defined in claim 26 in which said annular ring is in the form of a dome extending upward from said bottom wall.

EARL MENDENHALL.
JUNIUS B. VAN HORN.
CLARENCE J. COBERLY.

CERTIFICATE OF CORRECTION.

Patent No. 2,002,918.                              May 28, 1935.

EARL MENDENHALL, ET AL.

It is hereby certified that error appears in the printed specification of the above numbered patent requiring correction as follows: Page 4, first column, line 6, claim 3, for "in" read to; and that the said Letters Patent should be read with this correction therein that the same may conform to the record of the case in the Patent Office.

Signed and sealed this 9th day of July, A. D. 1935.

(Seal)                                        Bryan M. Battey
                                                     Acting Commissioner of Patents.